(12) United States Patent
Dewan et al.

(10) Patent No.: US 11,853,308 B2
(45) Date of Patent: Dec. 26, 2023

(54) SYSTEMS AND METHODS FOR RE-ORDERING SOCIAL MEDIA FEED ITEMS

(71) Applicant: Rovi Guides, Inc., San Jose, CA (US)

(72) Inventors: Radhika Dewan, Panchkula (IN); Vishwas Sharadanagar Panchaksharaiah, Tumkur District (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/722,814

(22) Filed: Dec. 20, 2019

(65) Prior Publication Data
US 2021/0191950 A1    Jun. 24, 2021

(51) Int. Cl.
*G06F 16/9536* (2019.01)
*G06F 16/2457* (2019.01)
*G06F 3/04847* (2022.01)
*G06F 16/9538* (2019.01)
*G06F 3/0485* (2022.01)

(52) U.S. Cl.
CPC ...... *G06F 16/24578* (2019.01); *G06F 3/0485* (2013.01); *G06F 3/04847* (2013.01); *G06F 16/9536* (2019.01); *G06F 16/9538* (2019.01)

(58) Field of Classification Search
CPC .............................. G06F 3/0482; G06F 3/0483
See application file for complete search history.

(56) References Cited

U.S. PATENT DOCUMENTS

| | | | |
|---|---|---|---|
| 7,761,892 B2 | 7/2010 | Ellis et al. | |
| 8,046,801 B2 | 10/2011 | Ellis et al. | |
| 8,230,350 B2 * | 7/2012 | Dodsworth | G06F 7/06 715/805 |
| 10,120,945 B2 * | 11/2018 | Eulenstein | G06F 16/9535 |
| 2005/0251827 A1 | 11/2005 | Ellis et al. | |
| 2010/0313223 A1 | 12/2010 | Straub | |
| 2010/0318923 A1 * | 12/2010 | Kim | G06Q 10/107 715/752 |
| 2014/0113596 A1 * | 4/2014 | Filev | G06Q 50/30 455/456.3 |
| 2015/0099481 A1 * | 4/2015 | Maitre | H04W 4/90 455/404.2 |
| 2015/0188875 A1 * | 7/2015 | Sharp | G06Q 10/10 715/752 |
| 2016/0011766 A1 | 1/2016 | Kosaka et al. | |

(Continued)

FOREIGN PATENT DOCUMENTS

WO    2015048181    4/2015

OTHER PUBLICATIONS

U.S. Appl. No. 16/722,817, filed Dec. 20, 2019, Radhika Dewan.
(Continued)

*Primary Examiner* — Rayeez R Chowdhury
(74) *Attorney, Agent, or Firm* — HALEY GUILIANO LLP

(57) ABSTRACT

The methods and systems described herein re-order social media feed items. In one example, the methods and systems receive on a user device social media feed items having a defined sequential order for display in a social media feed. The methods and systems also detect an occurrence of a triggering event and in response to the detection, reorder one or more of the social media feed items in a new order for display. The methods and systems further generate for display the one or more social media feed items in the social media feed in the new order.

16 Claims, 8 Drawing Sheets

(56) References Cited

U.S. PATENT DOCUMENTS

| | | | |
|---|---|---|---|
| 2016/0021213 A1 | 1/2016 | Ruan et al. | |
| 2016/0041722 A1* | 2/2016 | Ren | G06F 16/40 715/765 |
| 2016/0196561 A1* | 7/2016 | Iyer | G06Q 50/01 705/304 |
| 2016/0274756 A1 | 9/2016 | Sakaguchi | |
| 2016/0373396 A1* | 12/2016 | Sorg | H04L 51/52 |
| 2017/0025096 A1 | 1/2017 | Fan et al. | |
| 2017/0171342 A1 | 6/2017 | Wang et al. | |
| 2017/0308246 A1 | 10/2017 | Deluca et al. | |
| 2018/0075034 A1* | 3/2018 | Wang | G06F 16/24578 |
| 2018/0302357 A1* | 10/2018 | Cohen | H04L 51/212 |
| 2020/0154166 A1* | 5/2020 | Rakshit | H04N 21/2187 |
| 2021/0191989 A1 | 6/2021 | Dewan et al. | |

OTHER PUBLICATIONS

PCT International Search Report and Written Opinion for International Application No. PCT/US2020/065633, dated Apr. 8, 2021.

\* cited by examiner

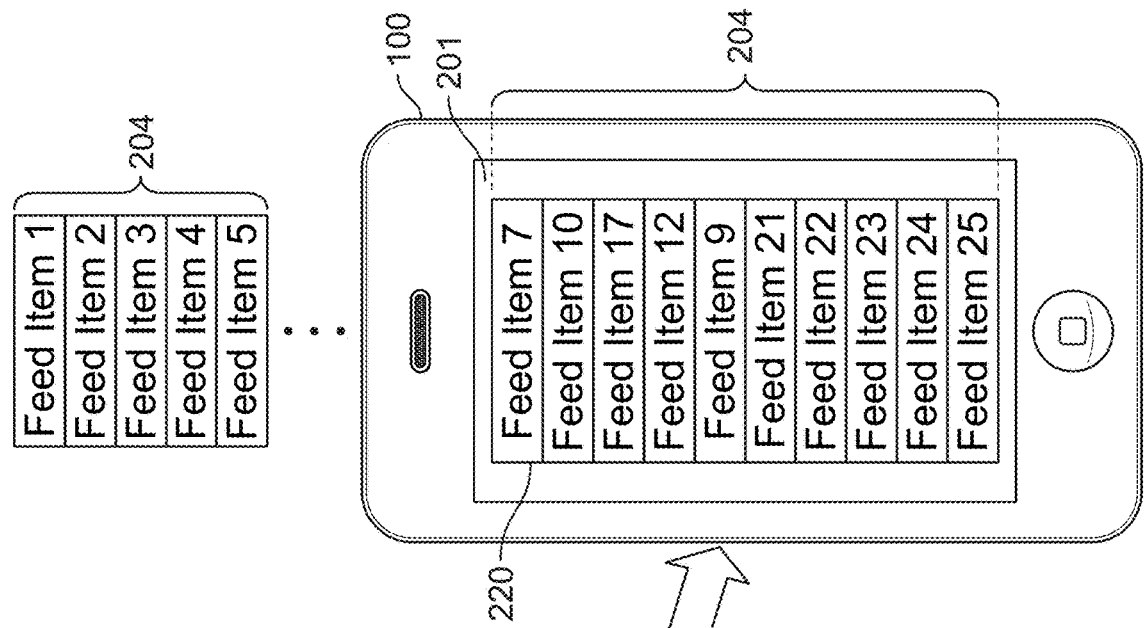
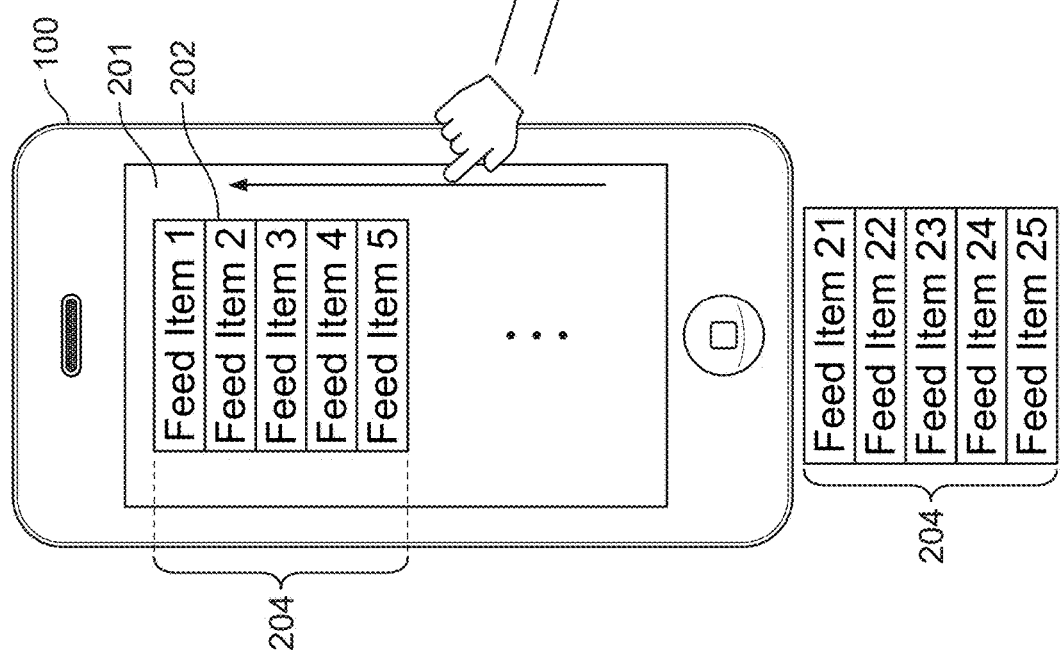
FIG. 2A
FIG. 2B

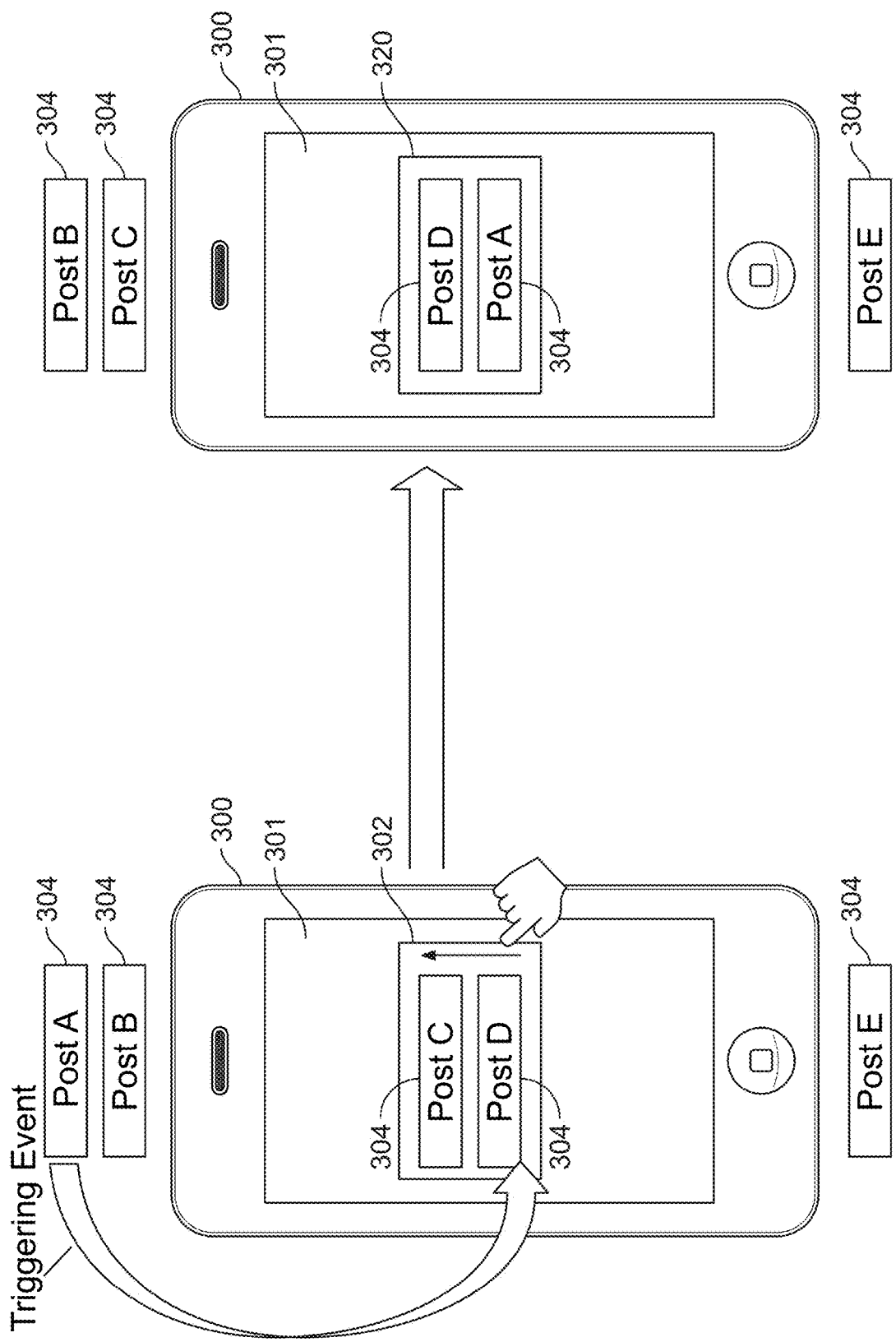

SYSTEMS AND METHODS FOR RE-ORDERING SOCIAL MEDIA FEED ITEMS

BACKGROUND

The present disclosure relates to feed content output systems and, more particularly, to re-ordering a defined sequential order of feed items in a new order for display on a user interface.

SUMMARY

Systems and methods are described herein for re-ordering feed items. Countless number of applications are downloaded from an application store (e.g. Google store or Apple store) that receives content feed items. Such applications include services such as media services, e.g., NETFLIX, AMAZON PRIME VIDEO, VIDEO ON DEMAND (VoD), WEST TV (WTW), MYSHOWS (MyShows), etc., social media services, e.g., FACEBOOK, TWITTER, INSTAGRAM, etc. and messaging services, e.g., E-MAIL, TEXT, INSTANT MESSAGING, WHATSAPP, etc. In conventional systems, feed items are downloaded into a user's device in a defined sequential order. However, once downloaded, the order of the feed items remains the same thus these feed items are displayed on the user device in the same defined sequential order. It is a cumbersome task for a user to go through each feed item in a list of feed items while browsing through numerous varieties of these services. As a result, a user scrolls down the feed list endlessly unless something really catches his/her eye. However, it is possible that the user may have missed some feed items such as social media posts in the feed lists, which might have been of interest to the user. If for example, an event such as the user scrolls too quickly through the social media feed list, he/she may miss seeing some posts that are of interest or relevant to the user. Thus, current systems do not provide flexibility to reorder the feed list in order to ensure that the user views the posts that are relevant to the user. In another example, a post related to an event such as Tsunami in Hawaii, which is important to the user may be downloaded as a last in batches of feed list for display on the user device. Thus, current systems do not provide the flexibility to reorder the feed list in order to ensure that the posts that are relevant to the user are displayed earlier in the batches of feed list regardless of when they were downloaded on the user device.

The solutions to the problems described above include reordering or reshuffling of the feed items downloaded into the user device before or during rendering for display on a user device. In one embodiment, the feed list is reordered into a new order such that the relevant feed items that were not seen by the user reappear in the newly ordered feed list. In one example, a relevant not seen feed item is placed on top of the feed list before displaying the newly ordered feed list on the user device. In another embodiment, the relevant not seen feed item is placed adjacent to a feed item currently being viewed by the user. In another embodiment, a relevant not seen feed item, which was quickly scrolled past, is moved to a different location in the feed so that it will be displayed again to the user. Accordingly, the methods and system described herein ensure that the user views the feed items that are relevant to the user.

In some embodiments, systems and methods are described herein for reordering a plurality or one or more of social media feed items for display on a user device. In some embodiments, the system receives on the user device, the plurality of the social media feed items having a defined sequential order for display in a social media feed. The system detects an occurrence of a triggering event and in response to the detection reorders the plurality of social media feed items in a new order for display. This can include reordering one or more social feed items such as, e.g., replacing the last social media feed item with the first item based on a triggering event. In this way, if the last item was deemed important to the user, it can move up in the order to be viewed by the user sooner. The system then generates for display the plurality of social media items in the social media feed in the new order.

In some embodiments, systems and methods are described herein for reordering feed items for display on a user device based on a user scroll. In some embodiments, the system stores in a memory of the user device, a plurality of feed items having a defined sequential order for display in a feed. The system monitors a speed of scrolling (scroll speed) the plurality of feed items and determines that the scroll speed is equal or greater than a scroll threshold. In response to this determination, the system reorders one or more of the feed items in a new order and generates for display the one or more feed items in the feed in the new order.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2A shows an illustrative example of a system display presenting a batch of feed items in a defined sequential order in accordance with some embodiments of the disclosure;

FIG. 2B shows an illustrative example of the system display of FIG. 2A presenting the batch of feed items in a new or reordered defined sequential order in accordance with some embodiments of the disclosure;

Figure 2D:
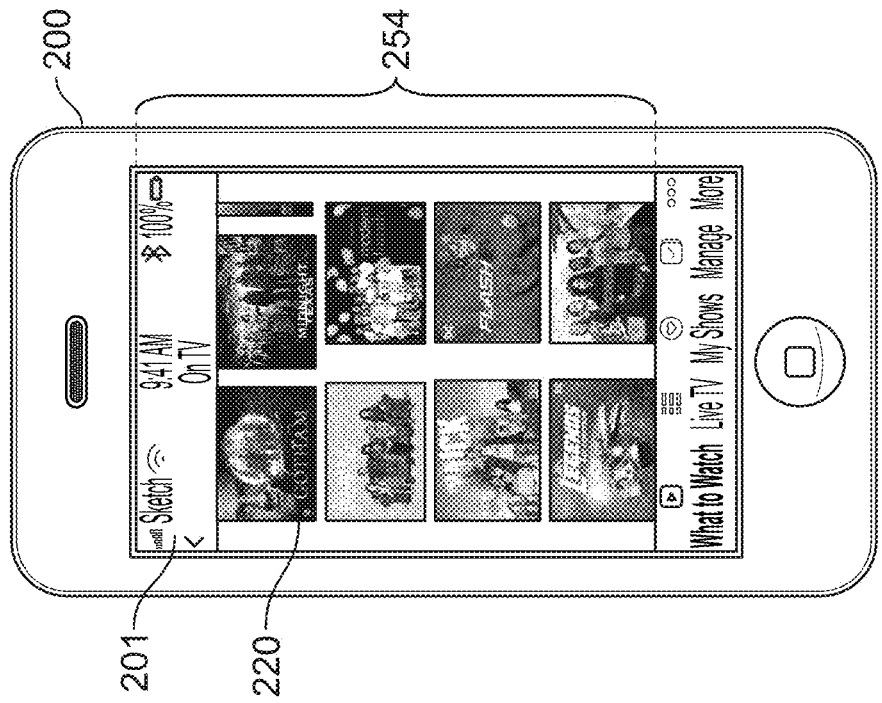
FIG. 2D shows an illustrative example of the system display of FIG. 2C in a new or reordered defined sequential order in accordance with some embodiments of the disclosure.
Figure 2C:
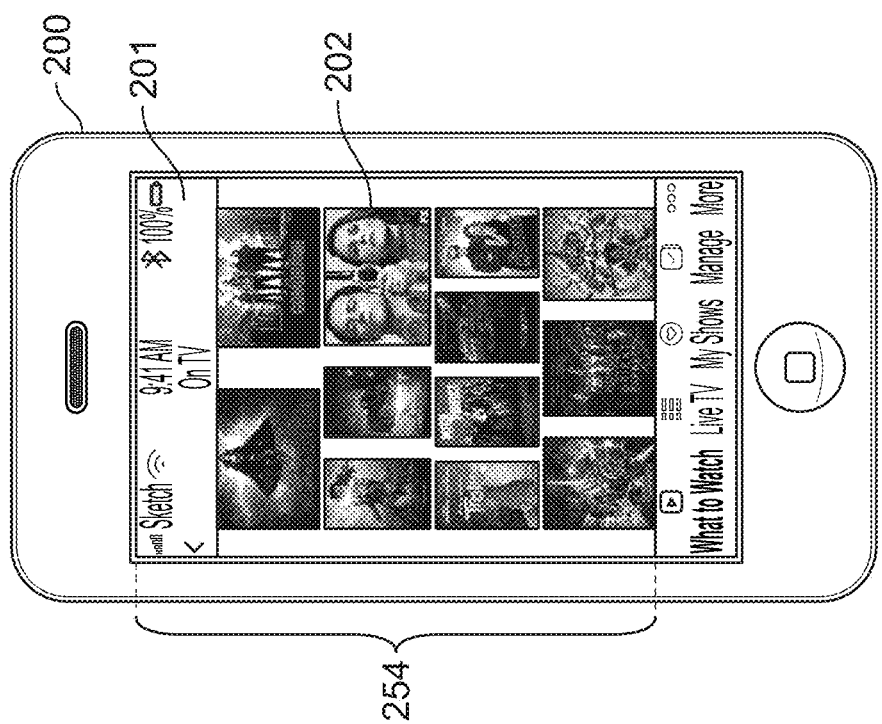
FIG. 2C shows an illustrative example of the system display of FIG. 2A presenting media feed items as the feed items in the defined sequential order in accordance with some embodiments of the disclosure.
Figure 4:
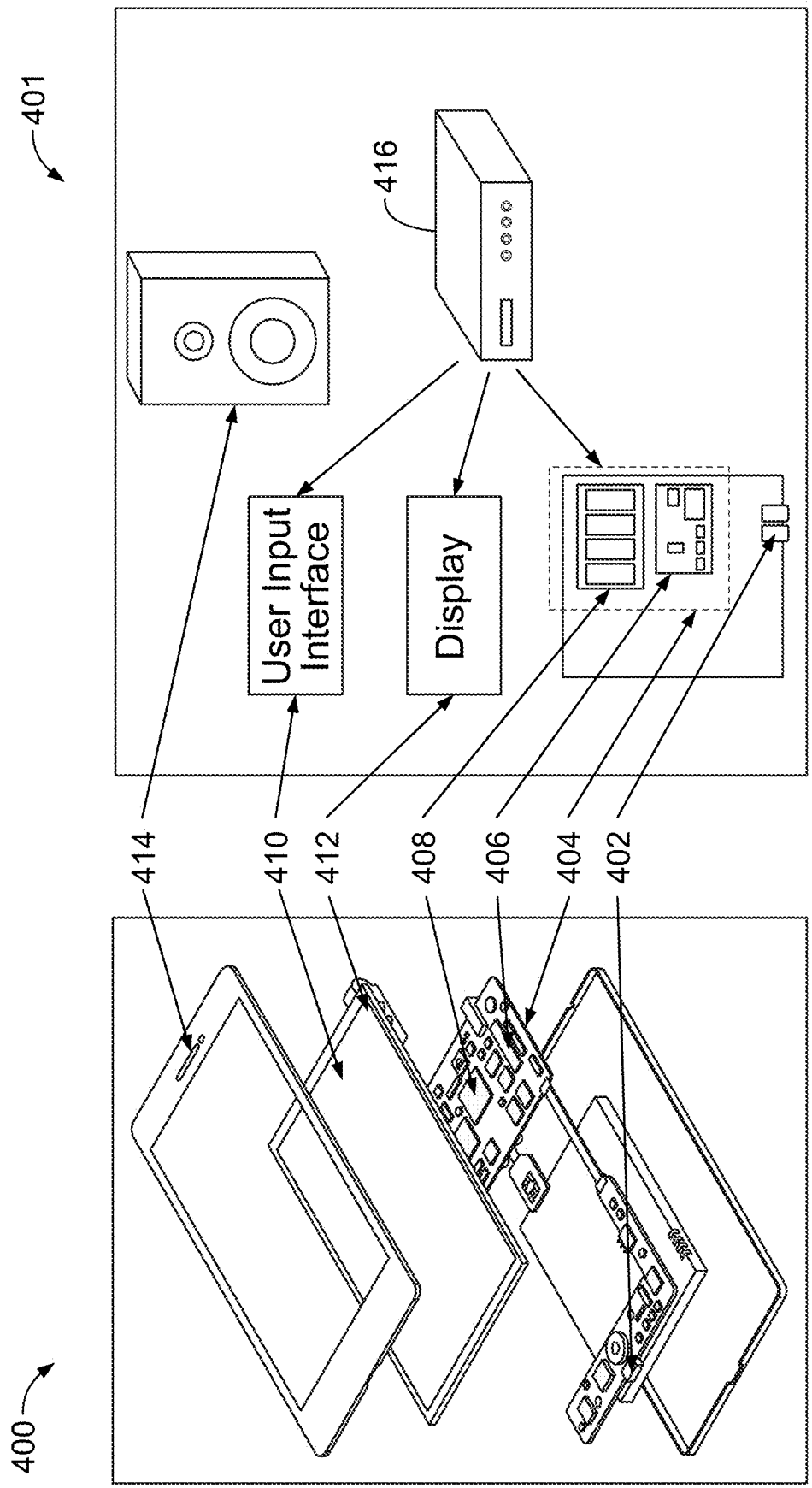
Figure 5:
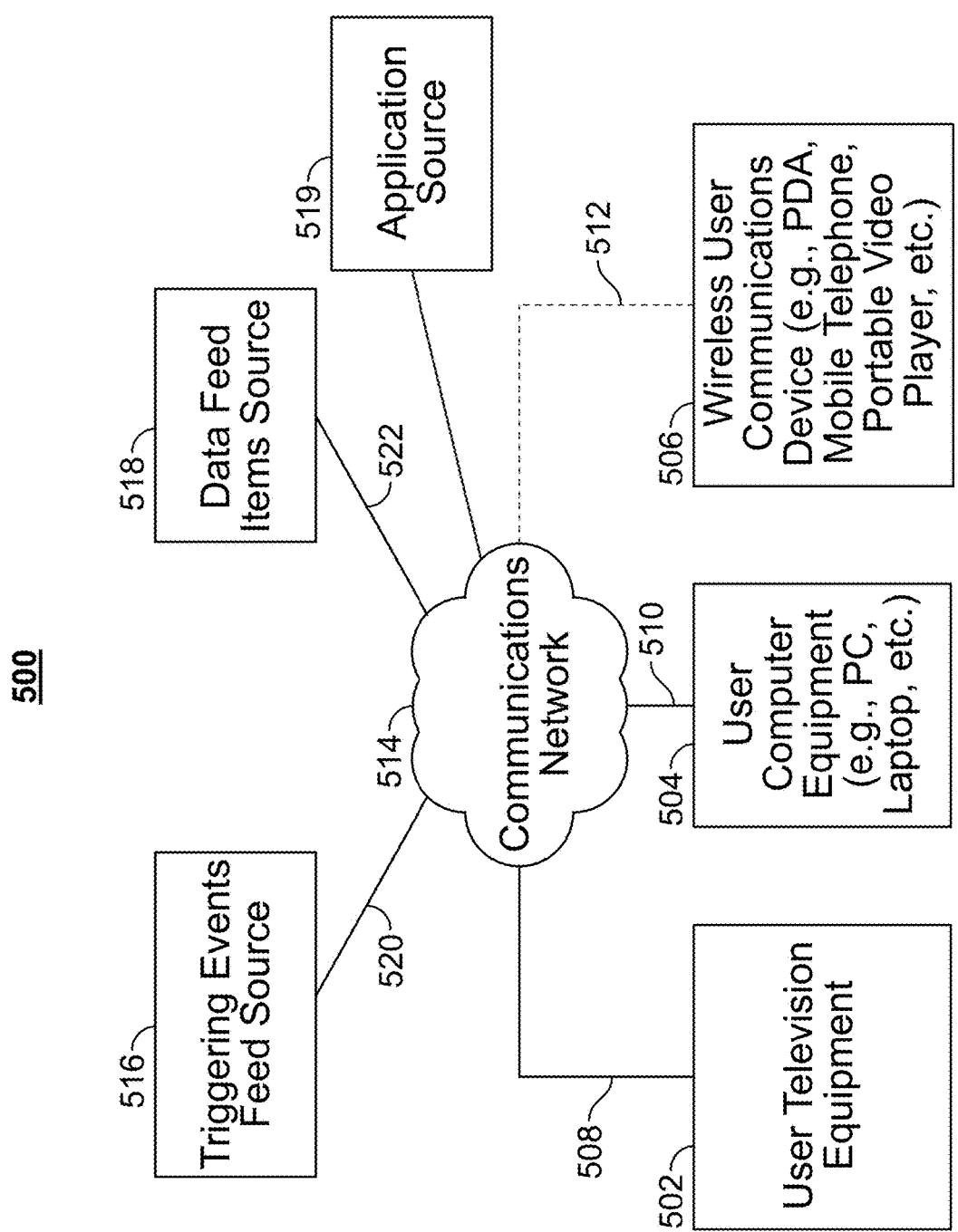
Figure 6:
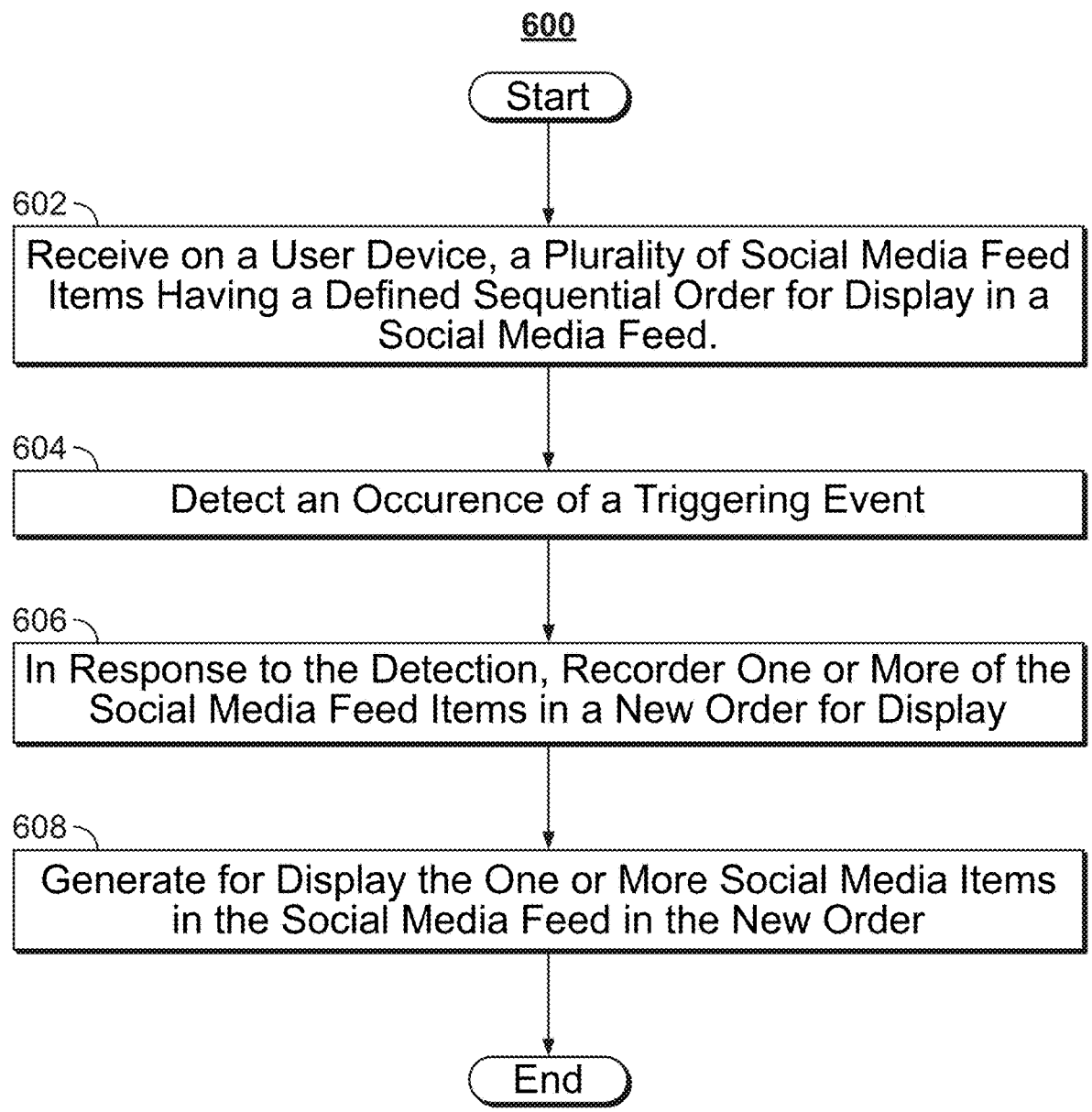
Figure 7:
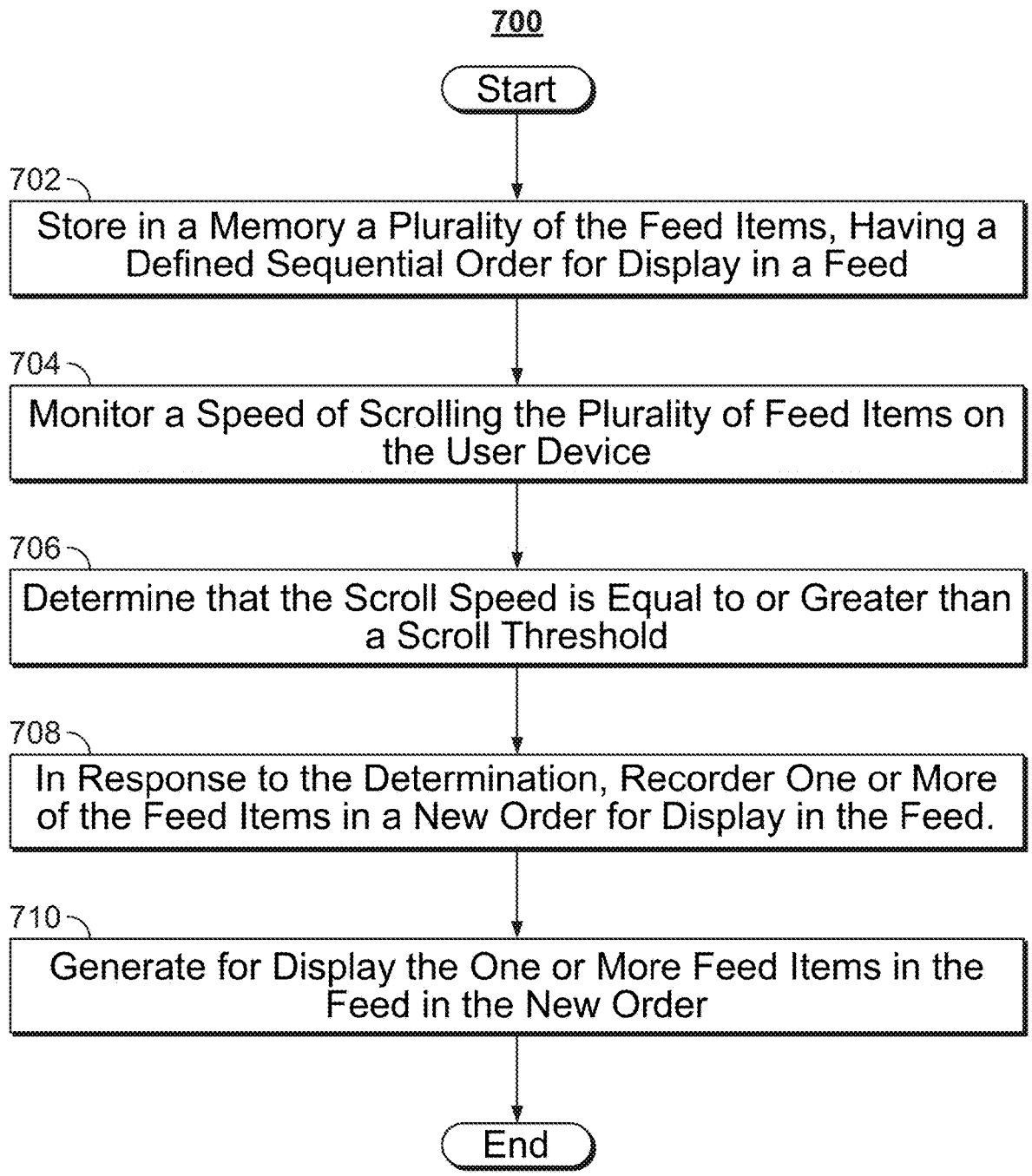

In some embodiments, the feed listing 202 is a media feed listing and feed items 204 are media feed items 254 associated with television programs or shows as shown in FIG. 2C and FIG. 2D;

FIG. 3A shows an illustrative example of a system display presenting social media posts in a defined sequential order in accordance with some embodiments of the disclosure;

FIG. 3B shows an illustrative example of the system display of FIG. 3A presenting the social media posts in a new or reordered defined sequential order, in accordance with some embodiments of the disclosure;

FIG. 4 is a block diagram of an illustrative content output system, in accordance with some embodiments of the disclosure;

FIG. 5 is a block diagram of an illustrative device, in accordance with some embodiments of the disclosure;

FIG. 6 depicts an illustrative flowchart of a process for reordering social media feed items, in accordance with some embodiments of the disclosure; and FIG. 7 depicts an illustrative flowchart of a process for reordering feed items based on a user scroll, in accordance with some embodiments of the disclosure.

DETAILED DESCRIPTION

Methods and systems are described herein for re-ordering a pre-defined order of feed items into a new order for display on a user interface (UI).

In some embodiments, control circuitry may detect an interaction associated with a user. The term "interaction," as used herein, is defined to mean any activity associated with a user's account of a service that provides the ability to create, share, exchange, and communicate information in virtual communities and networks. The term "feed item" includes content associated with the user's account of service. As discussed above, the service may include a media service, e.g., NETFLIX, AMAZON PRIME VIDEO, VIDEO ON DEMAND (VoD), WEST T (WTW), MYSHOWS (MyShows), etc., FACEBOOK, TWITTER, INSTAGRAM, etc., and messaging services, e.g., E-MAIL, TEXT, INSTANT MESSAGING, WHATSAPP, etc. In one example, control circuitry may detect that the user posted a comment related to the user's friend on a social media page (e.g., FACEBOOK).

Figure 1B:
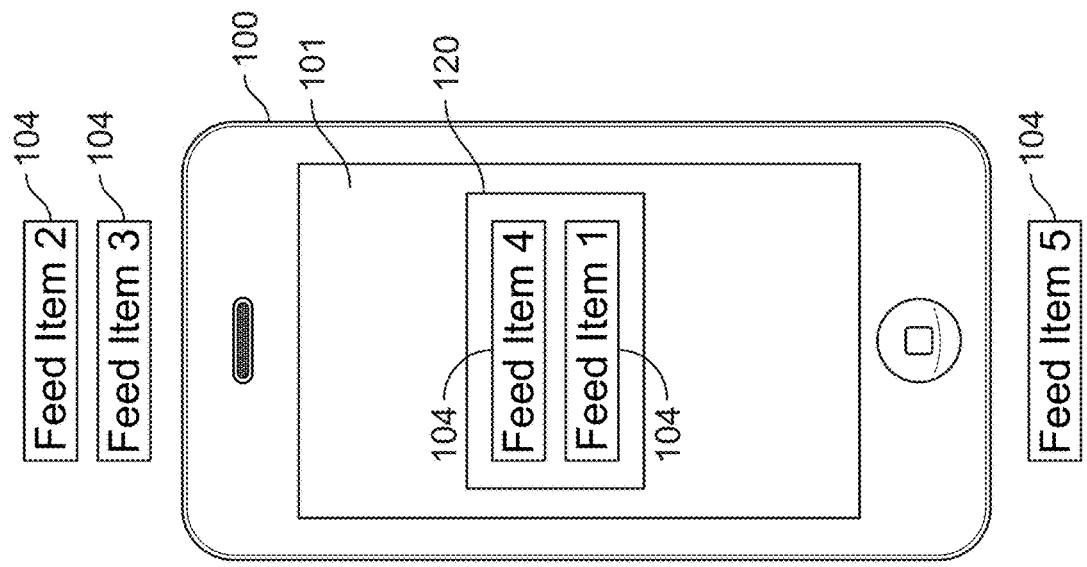
FIG. 1B shows an illustrative example of the system display of FIG. 1A presenting the feed items in a new or reordered defined sequential order, in accordance with some embodiments of the disclosure.
Figure 1A:
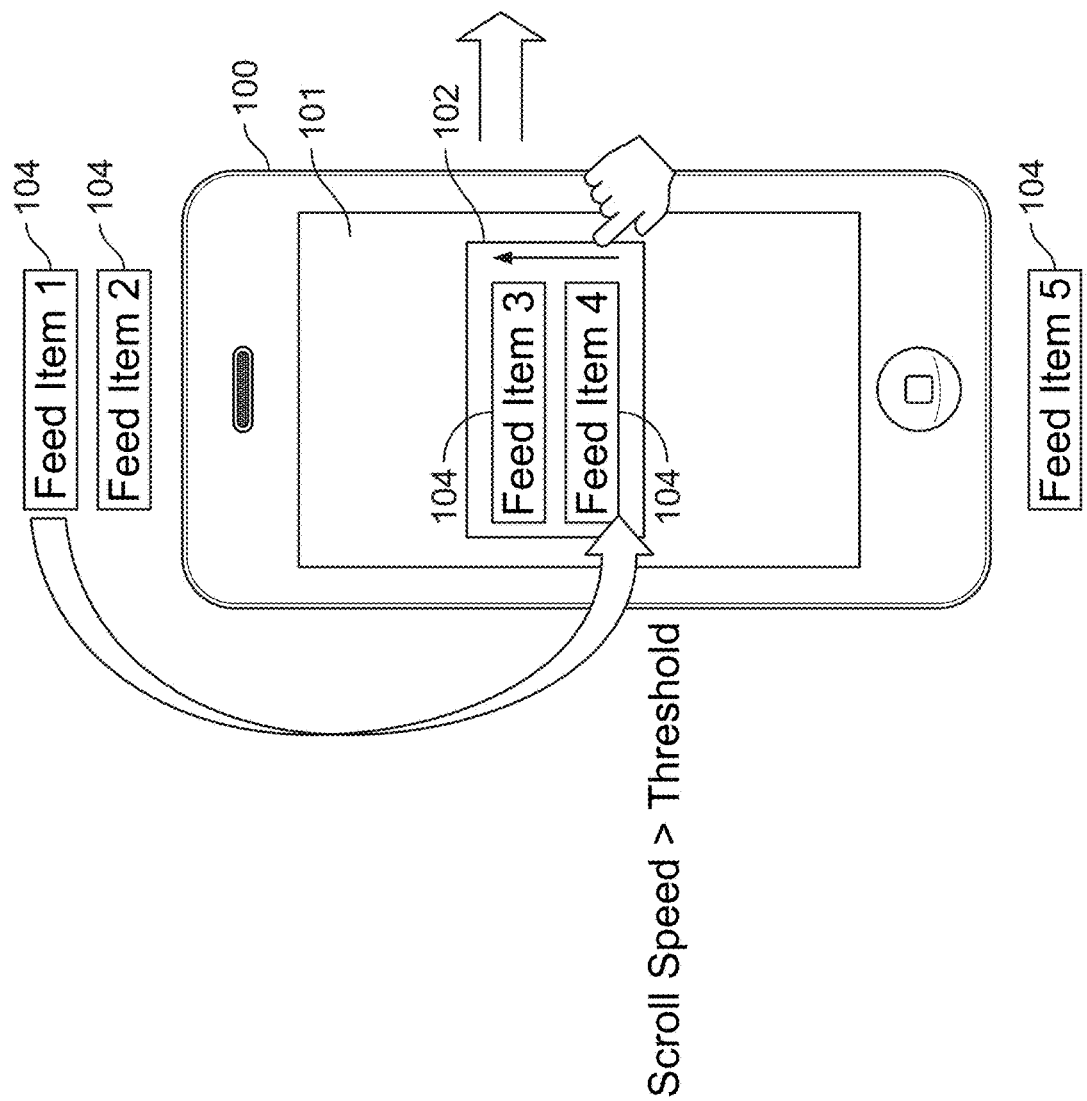
FIG. 1A shows an illustrative example of a system display presenting feed items in a defined sequential order in accordance with some embodiments of the disclosure.

FIG. 1A and FIG. 1B show illustrative display screen 101 on a user device 100 that may be used to provide feed data in a defined sequential order and a new order (reordered defined sequential order). Some examples of the user device include a mobile device, a personal, laptop or tablet computer, a television, etc. The display screen may be implemented on any suitable user equipment device or platform. The display may be a full screen display or may also be fully or partially overlaid over content being displayed. A user may indicate a desire to access content information by selecting a selectable option (not shown) provided in a display screen (e.g., a menu option, a listings option, an icon, a hyperlink, etc.) or another user input interface or device. In response to the user's indication, a feed application (e.g., social media feed application) may provide a display screen with feed data organized in one of several ways, such as by time and feed item in a grid, by time, by feed item, by source, by content type, by category of service (e.g., social media, media, messaging or other categories of services), or other predefined, user-defined, or other organization criteria. In one embodiment, the feed items are downloaded for display on the user device in the same defined order in a feed. Thus, the user device will show the feed list in the same defined order sent by the service.

In one embodiment, a circuitry (e.g. control circuitry 404 of FIG. 4) in the user device 100 requests the service to provide feed items. The user device 100 receives a feed listing (sequential order listing) 102 including feed items 104 arranged in a pre-defined sequential (e.g. numerical) order displayed on the display screen 101 as shown in FIG. 1A.

In one embodiment, each of the feed items 104 received from a server of the service includes metadata such as a feed item identifier (id) that uniquely identifies the feed item and a priority assigned to each of the feed items 102 in the sequential order feed listing 102. In one embodiment, the priority defines a relevancy of the feed item to a user of the user device 100. In one embodiment, the priorities assigned to the Feed Items are based on characteristics from user profile. In some embodiments, the characteristic include what is trending now, any events happening like an election, rally, natural calamity, etc. In other embodiments, the characteristics include ranking data stored in a user profile. In one embodiment, the ranking data includes a ranking of the user's friends posting social media feeds. For example, a social media feed posted directly from one friend who the user identifies as his/her best friend will have a higher priority than a social media feed posted by another friend, who the user identifies as for example just a good friend. In another embodiment, the ranking data includes ranking of VoD media assets. For example, VoD media assets, which are expiring soon will have higher priority than other VoD media assets. In another embodiment the ranking data includes My-Shows. For example, My-shows, which are soon to be deleted will have higher priority than other My-shows, etc. In another example, My-Shows, which are recorded with keep until the user delete will have medium to low priority, etc. In one embodiment, the feed items are categorized into 5 priorities, P1, P2, P3, P4 and P5 with P1 having the highest priority and P5 having the lowest priority. Priority will be different for different users and will keep changing with time for feeds. An example of the feed items, which includes the id and the priority is illustrated in chart below.

Feed item will consist of id and priority returned from server.

```
{
  "feeditems:
  [
      {"id":Feed Item 1, "priority": P1},
      {"id":Feed Item 2, "priority": P2},
      {"id":Feed Item 3, "priority": P4},
      {"id":Feed Item 4, "priority": P1}
      {"id":Feed Item 5 "priority": P3}
  ]
}
```

As shown in the chart, some examples of the id of the feed items include Feed Item 1, Feed Item 2, Feed Item 3, Feed Item 4 and Feed Item 5 and some examples of the priority include P1, P2, P3 and P4. Also, P1 is assigned to Feed Items 1 and 4, P2 is assigned to Feed Item 2, P4 is assigned to Feed Item 3 and P3 is assigned to Feed Item 5. As discussed above, P1 has the highest priority such that the Feed items having the priority P1 have the maximum relevancy to the user. Each successive priority level (i.e., P2, P3, etc.) will have a lower determined relevancy to the user than the prior priority level. In the example described above, priority level P4 has the lowest determined relevancy to the user. In other embodiments, the circuitry receives the feed items and their corresponding ids and assigns the priority to each of the feed items.

In one embodiment, the circuitry stores the sequential order feed listing 102 including the Feed items 104 with their corresponding id and priority in a memory (e.g. storage 408 FIG. 4). The circuitry also stores an additional field for each feed item indicating whether the feed item was displayed to a user or not. In one example, the sequential order feed listing 102 is stored as a Table 1A in the memory as shown below.

TABLE 1A

| Response from Service | Store result in Array List in the Client Device |
|---|---|
| <Feed Item 1, P1> | <Feed Item 1, P1, F> |
| <Feed Item 2, P2> | <Feed Item 2, P2, F> |
| <Feed Item 3, P4> | <Feed Item 3, P4, F> |
| <Feed Item 4, P1> | <Feed Item 4, P1, F> |
| <Feed Item 5, P3> | <Feed Item 5, P3, F> |

As illustrated in the Table 1A above, the feed items 104 are downloaded from the Service to the user device 100 in an array listing the feed items in a defined sequential order. Such order is listed starting with Feed Item 1 being first in the list, Feed Item 2 being second in the list, Feed Item 3 being third in the list, Feed Item 4 being fourth in the list and Feed Item 5 being fifth in the list. Each of the feed item includes feed item ids, a corresponding priority and a corresponding additional field identified by False (F) indicating that that the feed item has not been generated for display on the user device. Initially, all the feed items indicate "F" when downloaded into the user device.

FIG. 1A shows an example of the illustrative display screen 101 including the sequential order feed listing 102 arranged in a numerical sequential order that enables access to the feed items 104 for display on the display screen 101 of the user device 100. As illustrated in FIG. 1A, the user device 100 currently displays two of the feed items 104 identified by their respective feed item identifiers, Item 3, and Feed Item 4 in the feed listing 102. In one embodiment, the Feed Item 1 and the Feed Item 2 was previously displayed on the user device. In embodiment, the column labeled "Store result in Array List in Client Device" in Table 1A above is updated to reflect that the corresponding additional field for Feed Items 1 to 5 are identified by True (T) indicating that that these feed items were or are currently displayed on the user device. The updated Table 1A, identified as Table 1B, is provided below:

TABLE 1B

| Response from Service | Store result in Array List in the Client Device |
|---|---|
| <Feed Item 1, P1> | <Feed Item 1, P1, T> |
| <Feed Item 2, P2> | <Feed Item 2, P2, T> |
| <Feed Item 3, P4> | <Feed Item 3, P4, T> |
| <Feed Item 4, P1> | <Feed Item 4, P1, T> |
| <Feed Item 5, P3> | <Feed Item 5, P3, T> |

In some embodiments, an event occurs, which is detected by the circuitry in the user device 100. In one embodiment, the event is an internal event that occurs internally in the user device 100. One example of the internal event includes a user scrolling through the list of feed items (e.g., media content items), which results in the user reaching at end of the feed listing and/or user waiting for next set or batch of feed items to be displayed on the user device. In some embodiments, the circuitry monitors the scroll speed of the feed and determines whether the user scroll speed is equal or greater than a speed threshold. In one example, it is determined that the user scroll speed is equal or greater than the speed threshold. The circuitry determines that the user fast scrolled through the sequential order feed listing 102 such that user skipped viewing one or more of the feed items 104 (e.g., the feed scrolled faster than a user is able to discern the feed content). In one embodiment, the circuitry checks the user profile to determine the priority of the one or more feed items 104 that were skipped and based on the priority reorders the sequential order feed listing 102 in a new order to ensure that the user views relevant skipped feed item. In some embodiments, the circuitry reorders the sequential order feed listing 102 so that the skipped feed item appears again in the new order, e.g., new order feed listing 120 (FIG. 1B). In one embodiment, the circuitry reorders the sequential order feed listing 102 so that the skipped feed item appears next to the currently displayed feed item in the new order (e.g., after the scroll speed decreased and is sufficiently slow). For example, the skipped feed item appears next to the currently displayed feed item as the user continues to scroll through the feed items 104.

In one example, as shown in FIG. 1A the user quickly scrolled past Feed Item 1 and the circuitry detects this quick scroll and determines that scroll speed of the user exceeded the scroll threshold. The circuitry further checks the table and determines that the Feed Item 1 is identified as having high priority, P1, which is highly relevant to the user. The circuitry reorders the sequential order feed listing 102 into a new order such that that the Feed Item 1 reappears in new feed listing 120 after the Feed Item 4, which is currently being displayed on the display screen 101 as shown in FIG. 1B. Thus, the Feed Item 1 is reordered to be displayed again on the user device 100 in the new order feed listing 120 as the user continues to scroll through the feed items 104.

In another example, the internal event is a change/update in a user's profile. In some embodiments, the update in the user's profile results in change in priorities of one or more of the feed items 104. In one embodiment, the circuitry detects this update in the user's profile and reorders the sequential order feed listing feed listing 102 in a new order to ensure that the one or more feed items having the highest priority (e.g., P1) in the updated user's profile are viewed by the user.

In some embodiments, feed items (e.g., social media feed items or posts) are downloaded in batches at a time for display in a defined order in a media feed (e.g. social media feed). In one embodiment, the total number of the feed items that are downloaded in the batches at a time is greater than N number of feed items that are displayed on the user device at the same time. In one example, the circuitry downloads a sequential order feed listing (202 in FIG. 2A) including a first batch of feed items (204 in FIG. 2A), e.g., 25 Feed Items identified by their respective feed identifiers, Feed Item 1 to Feed Item 25 on the user device as shown in Table 2A below.

TABLE 2A

| Response from Service | Store result in Array List in the Client Device |
|---|---|
| <Feed Item 1, P1> | <Feed Item 1, P1, F> |
| <Feed Item 2, P2> | <Feed Item 2, P2, F> |
| <Feed Item 3, P4> | <Feed Item 3, P4, F> |
| <Feed Item 4, P1> | <Feed Item 4, P1, F> |
| <Feed Item 5, P3> | <Feed Item 5, P3, F> |
| <Feed Item 6, P3> | <Feed Item 6, P3, F> |
| <Feed Item 7, P1> | <Feed Item 7, P1, F> |
| <Feed Item 8, P3> | <Feed Item 8, P3, F> |
| <Feed Item 9, P1> | <Feed Item 9, P2, F> |
| <Feed Item 10, P1> | <Feed Item 10, P1, F> |
| <Feed Item 11, P3> | <Feed Item 11, P3, F> |
| <Feed Item 12, P1> | <Feed Item 12, P2, F> |
| <Feed Item 13, P3> | <Feed Item 13, P3, F> |
| <Feed Item 14, P3> | <Feed Item 14, P3, F> |
| <Feed Item 15, P3> | <Feed Item 15, P3, F> |
| <Feed Item 16, P4> | <Feed Item 16, P4, F> |
| <Feed Item 17, P1> | <Feed Item 17, P2, F> |
| <Feed Item 18, P3> | <Feed Item 18, P3, F> |

TABLE 2A-continued

| Response from Service | Store result in Array List in the Client Device |
|---|---|
| <Feed Item 19, P5> | <Feed Item 19, P5, F> |
| <Feed Item 20, P3> | <Feed Item 20, P3, F> |
| <Feed Item 21, P3> | <Feed Item 21, P3, F> |
| <Feed Item 22, P3> | <Feed Item 22, P3, F> |
| <Feed Item 23, P3> | <Feed Item 23, P3, F> |
| <Feed Item 24, P5> | <Feed Item 24, P5, F> |
| <Feed Item 25, P4> | <Feed Item 25, P4, F> |

As illustrated in the Table 2A above, a batch of the 25 feed items are downloaded from the Service to a user device (200 in FIG. 2A) in an array listing the feed items in a defined sequential order. Initially, all the 25 feed items indicate "F" when downloaded into the user device.

FIG. 2A illustrates a user device 200 having a display screen 201. In one embodiment, the user device 200 is similar to the user device 100 discussed above. In one embodiment, the circuitry displays on the display screen 201 (similar to the display screen 101) of the user device 200 the first five social media feed items among the first batch of the feed items 204 in a sequential order feed listing 202 as illustrated in FIG. 2A at one time. For example, the first five feed items are identified by their respective feed item identifiers, Feed item 1, Feed Item 2, Feed Item 3, Feed Item 4 and Feed Item 5. In one embodiment, the column labeled "Store result in Array List in Client Device" in table 2A above is updated to reflect that the corresponding additional field for Feed Items 1 to 5 are identified by True (T) indicating that that these feed items were previously or are currently being displayed on the user device. The updated Table 2A, identified as Table 2B, is provided below:

TABLE 2B

| Response from Service | Store result in Array List in the Client Device |
|---|---|
| <Feed Item 1, P1> | <Feed Item 1, P1, T> |
| <Feed Item 2, P2> | <Feed Item 2, P2, T> |
| <Feed Item 3, P4> | <Feed Item 3, P4, T> |
| <Feed Item 4, P1> | <Feed Item 4, P1, T> |
| <Feed Item 5, P3> | <Feed Item 5, P3, T> |
| <Feed Item 6, P3> | <Feed Item 6, P3, F> |
| <Feed Item 7, P1> | <Feed Item 7, P1, F> |
| <Feed Item 8, P3> | <Feed Item 8, P3, F> |
| <Feed Item 9, P2> | <Feed Item 9, P2, F> |
| <Feed Item 10, P1> | <Feed Item 10, P1, F> |
| <Feed Item 11, P3> | <Feed Item 11, P3, F> |
| <Feed Item 12, P2> | <Feed Item 12, P2, F> |
| <Feed Item 13, P3> | <Feed Item 13, P3, F> |
| <Feed Item 14, P3> | <Feed Item 14, P3, F> |
| <Feed Item 15, P3> | <Feed Item 15, P3, F> |
| <Feed Item 16, P4> | <Feed Item 16, P4, F> |
| <Feed Item 17, P2> | <Feed Item 17, P2, F> |
| <Feed Item 18, P3> | <Feed Item 18, P3, F> |
| <Feed Item 19, P5> | <Feed Item 19, P5, F> |
| <Feed Item 20, P3> | <Feed Item 20, P3, F> |
| <Feed Item 21, P3> | <Feed Item 21, P3, F> |
| <Feed Item 22, P3> | <Feed Item 22, P3, F> |
| <Feed Item 23, P3> | <Feed Item 23, P3, F> |
| <Feed Item 24, P5> | <Feed Item 24, P5, F> |
| <Feed Item 25, P4> | <Feed Item 25, P4, F> |

Also, shown in FIG. 2A, a user scrolling fast through Feed Items 6-20 and stopping at Feed Item 21 in the first batch of the Feed Items 204. In one embodiment, the circuitry monitors the scroll speed of the feed as the user scrolls through Feed items 6-20 and determines that the scroll speed of the feed exceeds the scroll threshold. Thus, the circuitry determines that the user skipped Feed Items 6-20 and thus identifies Feed Items 6-20 in the first batch of Feed Items 204 as not seen by the user. In one embodiment, the circuitry determines the priority assigned to the not-seen Feed Items 6-20 from the table 2A. As shown, a priority P1 (i.e., highest priority) is assigned to the Feed Items 7 and 12 and a priority P2 (i.e. second highest priority) is assigned to the Feed Items 17, 12 and 9. In one embodiment, the circuitry reorders the sequential order feed listing 202 into a new order feed listing 220 (FIG. 2B) beginning at Feed Item 16 such that Feed Items 16, 17, 18, 19 and 20 are moved and stored in other locations/rows in the array list in the table and Feed Items 7, 10, 17, 12 and 9 are moved and stored in rows where the Feed Items 16, 17, 18 19 and 20 respectively were previously stored prior to being moved into the other rows. in the array list resulting in update of the Table 2B with Table 2C below.

TABLE 2C

| Response from Service | Store result in Array List in the Client Device |
|---|---|
| <Feed Item 1, P1> | <Feed Item 1, P1, T> |
| <Feed Item 2, P2> | <Feed Item 2, P2, T> |
| <Feed Item 3, P4> | <Feed Item 3, P4, T> |
| <Feed Item 4, P1> | <Feed Item 4, P1, T> |
| <Feed Item 5, P3> | <Feed Item 5, P3, T> |
| <Feed Item 6, P3> | <Feed Item 6, P3, F> |
| <Feed Item 7, P1> | <Feed Item 16, P4, F> |
| <Feed Item 8, P3> | <Feed Item 8, P3, F> |
| <Feed Item 9, P2> | <Feed Item 20, P3, F> |
| <Feed Item 10, P1> | <Feed Item 18, P3, F> |
| <Feed Item 11, P3> | <Feed Item 11, P3, F> |
| <Feed Item 12, P2> | <Feed Item 19, P5, F> |
| <Feed Item 13, P3> | <Feed Item 13, P3, F> |
| <Feed Item 14, P3> | <Feed Item 14, P3, F> |
| <Feed Item 15, P3> | <Feed Item 15, P3, F> |
| <Feed Item 16, P4> | <Feed Item 7, P1, F> |
| <Feed Item 17, P2> | <Feed Item 10, P1, F> |
| <Feed Item 18, P3> | <Feed Item 17, P2, F> |
| <Feed Item 19, P5> | <Feed Item 12, P2, F> |
| <Feed Item 20, P3> | <Feed Item 9, P2, F> |
| <Feed Item 21, P3> | <Feed Item 21, P3, F> |
| <Feed Item 22, P3> | <Feed Item 22, P3, F> |
| <Feed Item 23, P3> | <Feed Item 23, P3, F> |
| <Feed Item 24, P5> | <Feed Item 24, P5, F> |
| <Feed Item 25, P4> | <Feed Item 25, P4, F> |

As shown in Table 2C above, the new order of the Feed Listing 220, the Feed Item 7 is moved to the previously stored location/row of Feed Item 16, Feed Item 10 is moved to the previously stored location/row of Feed Item 17, Feed Item 17 is moved to the previously stored location/row of Feed Item 18-Feed Item 12 is moved to the previously stored location/row of Feed Item 19 and Feed Item 9 is moved to the previously stored location/row of Feed Item 20. In one example, the Feed Items 7 and 10 having the priority of P1 are placed above the Feed Items 17, 12 and 9 having the priority of P2.

In one embodiment, as shown in FIG. 2B, the circuitry displays on the display screen 201 of the user device 200, the Feed Items 7, 9, 10, 12 and 17 in the new order of feed listing 220. It will be understood that if the reordering did not take place, the circuitry would display Feed Items 21-25. However, by reordering and starting the display at Feed Item 7, which corresponds to original Feed Item 16, the system presents the 5 highest priority Feed Items that were skipped before continuing to display Feed Items 21 and higher. In one embodiment, the column labeled "Store result in Array List in Client Device" in table 2C above is updated to reflect that the corresponding additional field for Feed Items 7, 9, 10, 12 and 17 are identified by True (T) indicating that these feed items are displayed on the user device 200. The updated Table 2C, identified as Table 2D, is provided below:

TABLE 2D

| Response from Service | Store result in Array List in the Client Device |
|---|---|
| <Feed Item 1, P1> | <Feed Item 1, P1, T> |
| <Feed Item 2, P2> | <Feed Item 2, P2, T> |
| <Feed Item 3, P4> | <Feed Item 3, P4, T> |
| <Feed Item 4, P1> | <Feed Item 4, P1, T> |
| <Feed Item 5, P3> | <Feed Item 5, P3, T> |
| <Feed Item 6, P3> | <Feed Item 6, P3, F> |
| <Feed Item 7, P1> | <Feed Item 16, P4, F> |
| <Feed Item 8, P3> | <Feed Item 8, P3, F> |
| <Feed Item 9, P2> | <Feed Item 20, P3, F> |
| <Feed Item 10, P1> | <Feed Item 18, P3, F> |
| <Feed Item 11, P3> | <Feed Item 11, P3, F> |
| <Feed Item 12, P2> | <Feed Item 19, P5, F> |
| <Feed Item 13, P3> | <Feed Item 13, P3, F> |
| <Feed Item 14, P3> | <Feed Item 14, P3, F> |
| <Feed Item 15, P3> | <Feed Item 15, P3, F> |
| <Feed Item 16, P4> | <Feed Item 7, P1, T> |
| <Feed Item 17, P2> | <Feed Item 10, P1, T> |
| <Feed Item 18, P3> | <Feed Item 17, P2, T> |
| <Feed Item 19, P5> | <Feed Item 12, P2, T> |
| <Feed Item 20, P3> | <Feed Item 9, P2, T> |
| <Feed Item 21, P3> | <Feed Item 21, P3, F> |
| <Feed Item 22, P3> | <Feed Item 22, P3, F> |
| <Feed Item 23, P3> | <Feed Item 23, P3, F> |
| <Feed Item 24, P5> | <Feed Item 24, P5, F> |
| <Feed Item 25, P4> | <Feed Item 25, P4, F> |

In some embodiments, the user fast scrolls from Feed Item 6 till the end of the first batch of the feed items 204 in the feed listing 202, i.e. Feed Item 25 and makes a request to get next batch of the Feed Items 204, i.e. next 25 of the Feed Items 204, i.e. Feed Items 26-50. In one embodiment, the circuitry compares the priority assigned to each of the feed items 26-50 in the next batch requested by the user and the priority assigned to feed items 6-25 which were skipped by the user (not seen by the user) while scrolling. In one embodiment, the circuitry determines that the priority assigned to some of the Feed Items, e.g., 7, 9, 10, 12 and 17 in the not-seen Feed Items 6-25 are higher than priority assigned to the next batch of the Feed Items 204, i.e. the Feed items 26-50. In one embodiment, the circuitry reorders the feed listing 202 into another new order feed listing (e.g. 220 in FIG. 2B) by swapping the Feed Items 26-30 with Feed Items 7, 9, 10, 12 and 17 respectively. The circuitry thus renders Feed Items Feed Items 7, 9, 10, 12 and 17 for display on the display screen 201 of the user device 200 before rendering Feed Items 26-30 for display. Thus, the user sees the Feed Items with higher priority first before viewing the Feed Items with lower priority on the display screen 201 of the user device 200.

In some embodiments, the feed listing 202 is a media feed listing and feed items 204 are media feed items 254 associated with television programs or shows as shown in FIG. 2C and FIG. 2D. In one embodiment, a user fast scrolls from feed item 6 to Feed Item 50 in the media feed items 254, which results in Feed Item 50 onwards being rendered to be downloaded from the service into the user device 200 as shown in FIG. 2C. The Feed Item 50 onwards are not displayed on the display screen 201 of the user device 200. In one embodiment, the circuitry monitors scroll speed of the feed as the user fast scrolls through Feed items 6-49 and determines that the scroll speed of the user exceeds the scroll threshold. Thus, the circuitry determines that the user skipped through the Feed Items 6-49 and thus identifies Feed Items 6-49 as not seen by the user. In one embodiment, the circuitry determines the priority assigned to the not-seen Feed Items 6-49. In one embodiment, the priority is based on the user profile including characteristics such as currently watched shows, bookmarked shows, soon to be expired shows (e.g., shows of the VoD), soon to be deleted shows (e.g., shows of MyShows), trending shows (e.g., shows of WTW), etc. In one embodiment, the circuitry reorders the Feed Listing 202 in a new order displaying the media feed items 254 in the Feed Items 6 to 50 having the priority P1 and/or P2 immediately before the display of the Feed Item 50 on the display screen 201 of the user device 200 onwards as shown in FIG. 2D. In one example, eight of the media feed items 254 between the Feed Items 6 to 50 are determined to have the priority of P1 and/or P2 as shown in FIG. 2D.

As discussed above, in some embodiments, a triggering event is detected by the circuitry in the user device 100. In some embodiments, the event is an external event which occurs outside the user device 100. Some examples of external events include natural disasters such as earthquake tornado, hurricane tsunami, etc., sport events, entertainment events, child entering a room where the user device is located, etc.

In one example, the external event includes a child walking into an area where an adult user is viewing content of the media feed items 254 on the user device 200. In one embodiment, the circuitry detects the child walking into the area and dynamically reorders the sequential order feed listing 202 such that unseen media feed items among the media feed items 254 that are relevant to both the adult user and the child are displayed on top of the user device 200 and unseen feed items among the media feed items 254 that are relevant only to the adult user are displayed on bottom of new order of the feed listing 220 ensuring that the child does not view the unseen feed items that are relevant only to the adult user. In one embodiment, the circuitry determines the relevancy of the media feed items to the child and the adult user based on priorities assigned to the media feeds items 254.

In another example the external event includes a second user initiating a new recording of a TV show, i.e. new media feed item (not shown) while the user is browsing My-shows, i.e. media feed items 254, in the sequential order feed listing 202. This recording of the new media feed item causes an existing recording of a media feed item among the media feed items 254 to be marked as for example, "soon to be deleted." In one embodiment, the circuitry detects the second user initiating the new recording of the new media feed item and determines media feed item(s) among the media feed items 254 that are related to this new media feed item. In one embodiment, the circuitry reorders the media feed items 254 by placing the related media item(s) on top (not shown) of the new order of the feed listing 220 to ensure that the user views the related media item(s).

In some embodiments, the sequential order feed listing 102 is a sequential order social media post listing 302 and feed items 104 are social media posts (posts) 304 as shown in a display screen 301 of a user device 300 in FIG. 3A. In some embodiments, the user device 300 is same as the user device 100 and the display screen 301 is the same as the display screen 101 of FIG. 1A. In some embodiments, the circuitry detects an external trigger event based on information related to the external event provided in a post among the posts 304 as the user scrolls through posts 304 in the sequential order social media post listing 302. In one embodiment, the circuitry monitors the feeds to identify the external trigger events and searches the social media posts 304 that have been scrolled past relevant to the triggering event. In another embodiment, the circuitry checks the user profile to determine that the priority of the post having the information on the external event is P1, i.e. highly relevant to the user. In some embodiments, the circuitry then reorders the sequential order social media post listing 302 in a new order, e.g., new order social media post listing 320 (FIG. 3B) so that the post among the posts 304 including the information on the external event that was skipped by the user while scrolling appears again in the new order to ensure that the user does not skip viewing this post. In one embodiment, the circuitry reorders the sequential order social media post listing 302 such that the post having the information on the external event appears again in the new order, e.g. the new order social media post listing 320. In another embodiment, the circuitry reorders the sequential order social media post listing 302 such that skipped post having the information on the external event appears adjacent to the currently displayed post as the user continues to scroll through the posts 304.

In one example, an earthquake occurred in California and Post A in current batch of the posts 304 is posted by the user's friend who lives in California. In one embodiment, the circuitry that the user quickly scrolled past Post A and determines that user skipped viewing the Post The circuitry checks the table and determines the priority of the Post A to be P1, which is highly relevant to the user. The circuitry reorders the sequential order feed listing 302 into a new order such that that the Post A reappears in new feed listing 320 after the Post D, which is currently being displayed on the display screen 301 as shown in FIG. 3B. Thus, the POST A is reordered to be displayed again on the user device 300 in the new order feed listing 320 as the user continues to scroll through the posts 304. In some embodiments, an indication of the triggering event (not shown) is also added to the new order social media post listing 320 to indicate the relevance of the reordered post A.

Users may access content from one or more of their devices. FIG. 4 shows generalized embodiments of a device capable of presenting content on a display 412. For example, display 412 may belong to a smartphone or computing device. In another example, display 412 may belong to a user television equipment system. User television equipment system with display 412 may include a set-top box 416. Set-top box 416 may be communicatively connected to speaker 414, and display 412. In some embodiments, display 412 may be a television display or a computer display. In some embodiments, set top box 416 may be communicatively connected to user interface input 410. In some embodiments, user interface input 410 may be a remote control device. Set-top box 416 may include one or more circuit boards. In some embodiments, the circuit boards may include processing circuitry, control circuitry, and storage (e.g., RAM, ROM, Hard Disk, Removable Disk, etc.). Such storage can include computer readable media, computer program products, etc. to store feed items and social feed applications including instructions to implement the reordering techniques described herein. In some embodiments, circuit boards may include an input/output path. More specific implementations of devices are discussed below in connection with FIG. 5. Each one of device 400 and user equipment system 401 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for an application such as a feed (e.g. social media feed) application stored in memory (e.g., storage 408). Specifically, control circuitry 404 may be instructed by the application to perform the functions discussed above and below. For example, the application may provide instructions to control circuitry 404 to detect an occurrence of a triggering event that causes to reorder the of feed items in a new order for display on the user device based on the detection of the triggered event. In some implementations, any action performed by control circuitry 404 may be based on instructions received from the application.

In client-server based embodiments, control circuitry 404 may include communications circuitry suitable for communicating with a content application server or other networks or servers. The instructions for carrying out the above-mentioned functionality may be stored on the content application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of devices, or communication of devices in locations remote from each other (described in more detail below).

Memory may be an electronic storage device provided as storage 408 that is part of control circuitry 404. As referred to herein, the phrase "electronic storage device" or "storage device" or "computer readable storage" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein, including, for example, batches of the social media feed items. Storage 408 may also be used to store identifications of each of the feed items, priority assigned to each of the feed items, user profile indicating relevancy of each of the social media feed items etc. Nonvolatile memory may also be used (e.g., to launch a boot-up routine and other instructions). Storage 408 may also store social feed applications including instructions to reorder feed items, updates to the social feed applications, or patches to the social feed applications. Cloud-based storage, described in relation to FIG. 5, may be used to supplement storage 408 or instead of storage 408. In some embodiments, a database is accessible at the cloud-based storage, where the database stores metadata files of content such as feed items (e.g. social media feed items) a look-up table mapping feed items or timestamped feed items to characteristics or related feed items, any suitable reference for control circuitry to retrieve when detecting occurrence of a triggering event and/or reordering the feed items in an new order based on the detection of the triggered event or any suitable combination thereof.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the device to receive and to display, to play, or to record content. The tuning and encoding circuitry may also be used to receive feed data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of each one of device 400 and user equipment system 401. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of each one of device 400 and user equipment system 401 or may be stand-alone units. The audio component of videos and other content displayed on display 412 may be played through speakers 414. In some embodiments, the audio may be distributed to a receiver (not shown), which processes and outputs the audio via speakers 414.

The feed application (e.g. social media feed application) may be implemented using any suitable architecture. For example, it may be a stand-alone application wholly-implemented on each one of device 400 and user equipment system 401. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. In some embodiments, the feed application can be downloaded to user equipment (e.g., user equipment system 401) from an application source such as a server or an App Store. In one example, the feed application is pre-configured and downloaded to user equipment to implement the reordering feed item techniques disclosed herein. In other examples, the feed application is downloaded to the user equipment then updated to implement the reordering techniques.

In some embodiments, the feed application is a client-server based application. Data for use by a thick or thin client implemented on each one of device 400 and user equipment system 401 is retrieved on-demand by issuing requests to a server remote to each one of device 400 and user equipment system 401. In one example of a client-server based application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400.

In some embodiments, the feed application is downloaded and interpreted or otherwise run by an interpreter or virtual machine (run by control circuitry 404). In some embodiments, the feed application may be encoded in the ETV Binary Interchange Format (EBIF), received by control circuitry 404 as part of a suitable feed, and interpreted by a user agent running on control circuitry 404. For example, the feed application may be an EBIF application. In some embodiments, the feed application may be defined by a series of JAVA-based files that are received and run by a local virtual machine or other suitable middleware executed by control circuitry 404. In some of such embodiments (e.g., those employing MPEG-2 or other digital media encoding schemes), the feed application may be, for example, encoded and transmitted in an MPEG-2 object carousel with the MPEG audio and video packets of a program.

Each one of device 400 and user equipment system 401 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or devices and may be substantially similar to devices described above. Devices, on which an application may be implemented, may function as a standalone device or may be part of a network of devices. Various network configurations of devices may be implemented and are discussed in more detail below.

A device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The application may have the same layout on various different types of user equipment or may be tailored to the display capabilities of the user equipment. For example, on user computer equipment 504, the feed application may be provided as a web site accessed by a web browser. In another example, the feed application may be scaled down for wireless user communications devices 506.

In system 500, there is typically more than one of each type of device but only one of each is shown in FIG. 5 to avoid overcomplicating the drawing. In addition, each user may utilize more than one type of device and also more than one of each type of device.

In some embodiments, a device (e.g., user television equipment 502, user computer equipment 504, wireless user communications device 506) may be referred to as a "second device." For example, a second device may provide an interface for adjusting settings and display preferences of the first device. In some embodiments, the second device is configured for interacting with other second devices or for interacting with a social network. The second screen device can be located in the same room as the first device, a different room from the first device but in the same house or building, or in a different building from the first device.

The user may also set various settings to maintain consistent application settings across in-home devices and remote devices. For example, if a user enables selection of browsing feed items (e.g., social media feed items) on their personal computer at their office, this feature would also be enabled on the user's in-home devices (e.g., user television equipment and user computer equipment) as well as the user's mobile devices, if desired. Therefore, changes made on one device can change the content experienced on another device, regardless of whether they are the same or a different type of device. In addition, the changes made may be based on settings input by a user, as well as user activity monitored by the feed application (e.g., social media feed application). In addition, two devices can work together to provide functionality for the user. For example, a first device can detect an occurrence of a triggering event and instruct a second device to reorder the feed items (e.g., social media feed items) based on the detection of the triggered event. In one embodiment, the first device is a remote server located outside the user equipment system 401 and the second device is the user equipment system 401. The remote server detects the occurrence of the triggering event and send instructions to the user equipment 401 to reorder the social media feed items into a new order and display the new order of the social media feed items on the user equipment 401. In some embodiments, the instructions include reorder the social media feed such that the social media feed item generated based on the triggered event reappears in the social media feed reappears in the social media feed. In one example, the instructions include reorder the social media feed such that the social media feed item generated based on the triggered event appears on top of the social media feed items currently displayed on the user device. In another example, the instructions include reorder the social media feed such that the social media feed item generated based on the triggered event appears on next to another social media feed item currently displayed on the user device.

The devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the devices may be provided by one or more of these communications paths but are shown as a single path in FIG. 5 to avoid overcomplicating the drawing.

Although communications paths are not drawn between devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 502-11x, etc.), or other short-range communication via wired or wireless paths. BLUETOOTH is a certification mark owned by Bluetooth SIG, INC. The devices may also communicate with each other directly through an indirect path via communications network 514.

System 500 includes triggering event feed source (event feed source) 516 for detecting events, data feed items (data feed) source 518 for providing feed items, and application source 519 to provide applications which can reorder feed items. The sources 516, 518, and 519 are coupled to communications network 514 via communication paths 520 and 522, respectively. Paths 520 and 522 may include any of the communication paths described above in connection with paths 508, 510, and 512. Communications with the event feed source 516, data feed source 518, and application source 519 may be exchanged over one or more communications paths but are shown as a single path in FIG. 5 to avoid overcomplicating the drawing. In addition, there may be more than one of each of event feed source 516, data feed source 518, and application source 519, but only one of each is shown in FIG. 5 to avoid overcomplicating the drawing. If desired, event feed source 516 and data feed source 518 may be integrated as one source device. Although communications between sources 516, 518, and 519 with devices 502, 504, and 506 are shown as through communications network 514, in some embodiments, sources 516, 518 and 519 may communicate directly with devices 502, 504, and 506 via communication paths (not shown) such as those described above in connection with paths 508, 510, and 512.

Event feed source 516 may include one or more types of content distribution equipment including a television distribution facility, cable system headend, satellite distribution facility, programming sources (e.g., television broadcasters), intermediate distribution facilities and/or servers, Internet providers, on-demand content servers, and other content providers. Event feed source 516 may be the originator of content (e.g., a television broadcaster, a Webcast provider, etc.) or may not be the originator of content (e.g., an on-demand content provider, an Internet provider of content of broadcast programs for downloading, etc.). Event feed source 516 may include cable sources, satellite providers, on-demand providers, Internet providers, over-the-top content providers, or other providers of content. Event feed source 516 may also include a remote content server used to store different types of content (including video content selected by a user), in a location remote from any of the devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Data feed source 518 may provide data related to the content. Content data may be provided to the devices using any suitable approach. In some embodiments, the feed application, may be a stand-alone interactive television program guide that receives program guide data via a data feed (e.g., a continuous feed or trickle feed). Program schedule data and other content data may be provided to the user equipment on a television channel sideband, using an in-band digital signal, using an out-of-band digital signal, or by any other suitable data transmission technique. Program schedule data and other content data may be provided to user equipment on multiple analog or digital television channels.

In some embodiments, information including triggering events (i.e. triggering event info) from the event feed source 516 are sent to the user equipment 504 so that the user equipment can detect the triggering events and reorder the feed items received from the data feed source 518. In other embodiments, triggering event info from the event feed source 516 are sent to a remote server (not shown) which detects the triggering events. In one embodiment, the trigger event info is sent from the remote server to the user equipment 504 with instructions to reorder the feed items. In another embodiment, the trigger event info is sent from the remote server to the user equipment 504 and the user equipment 504 reorders the data feed items depending on which feed items are currently displayed on the user equipment 504.

In some embodiments, content data from data feed source 518 may be provided to user's equipment using a client-server approach. For example, a user equipment device may pull content data from a server, or a server may push content data to a user equipment device. In some embodiments, a feed application client residing on the user's equipment may initiate sessions with source 518 to obtain content data when needed, e.g., when the content data is out of date or when the device requests the data. Content data may be provided to the user equipment with any suitable frequency (e.g., continuously, daily, a user-specified period of time, a system-specified period of time, in response to a request from user equipment, etc.). Data feed source 518 may provide devices 502, 504, and 506 the application itself or software updates for the application.

In some embodiments, the content data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The content data may include metadata files pertaining to the content such as feed items, e.g., message feed items, media feed items, social media feed items, etc. The content data may include identifications and priority assigned to the feed items by the service. For example, the content data may include event that is trending now, any events happening like election, rally, natural calamity. The content data may also include user profile indicating relevancy/priority of the feed items. For example, the content data may include priority of the social media feed posted directly from user's friends. In another example, the content data may include information related to the media feeds such as soon to be deleted media feeds, expiring soon media feeds, recording with keep until user delete media feeds, etc.

Applications may be, for example, stand-alone applications implemented on devices, which can be downloaded from application source 519. For example, the application may be implemented as software or a set of executable instructions which may be stored in storage 408 and executed by control circuitry 404 of each one of device 400 and user equipment system 401. In some embodiments, applications may be client-server applications where only a client application resides on the device, and server application resides on a remote server. For example, applications may be implemented partially as a client application on control circuitry 404 of each one of device 400 and user equipment system 401 and partially on a remote server as a server application (e.g., data feed source 518) running on control circuitry of the remote server. When executed by control circuitry of the remote server (such as data feed source 518), the application may instruct the control circuitry to generate the content displays and transmit the generated displays to the devices. The server application may instruct the control circuitry of the data feed source 518 to transmit data for storage on the device. The client application may instruct control circuitry of the receiving user equipment to generate the content displays.

Content and/or content data delivered to devices 502, 504, and 506 may be over-the-top (OTT) content. OTT content delivery allows Internet-enabled user devices, including any device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide content data described above.

Content output system 500 is intended to illustrate a number of approaches, or network configurations, by which devices and sources of content and content data may communicate with each other for the purpose of accessing content and providing the ability generate for detecting occurrence of a triggering event, reordering the feed items (e.g. social media feed items) in new order (different from previous order) based on the detection of the triggered event and generate for display the feed items (e.g. social media feed items) in the feed (e.g. social media feed) in the new order. The embodiments described herein may be applied in any one or a subset of these approaches, or in a system employing other approaches for downloading and displaying the content. The following four approaches provide specific illustrations of the generalized example of FIG. 5

In one approach, devices may communicate with each other within a home network. Devices can communicate with each other directly via short-range point-to-point communication schemes described above, via indirect paths through a hub or other similar device provided on a home network, or via communications network 514. Each of the multiple individuals in a single home may operate different devices on the home network. As a result, it may be desirable for various feed application information or settings to be communicated between the different devices. For example, it may be desirable for users to maintain consistent application settings on different devices within a home network, as described in greater detail in Ellis et al., U.S. Patent Publication No. 2005/0251827, filed Jul. 11, 2005. Different types of devices in a home network may also communicate with each other to transmit content. For example, a user may use content navigation button on one device while the content is transmitted to a second device to be generated for display.

In a second approach, users may have multiple types of user equipment by which they access content. For example, some users may have home networks that are accessed by in-home and mobile devices. Users may control in-home devices via an application implemented on a remote device. For example, users may access an online application on a website via a personal computer at their office, or a mobile device such as a PDA or web-enabled mobile telephone. The user may set various settings (e.g., recordings, reminders, timelines and the locations of the media feeds, display enablement, or other settings) on the online feed application to control the user's in-home equipment. The online application may control the user's equipment directly, or by communicating with an application on the user's in-home equipment. Various systems and methods for devices communicating, where the devices are in locations remote from each other, is discussed in, for example, Ellis et al., U.S. Pat. No. 8,046,801, issued Oct. 25, 2011, which is hereby incorporated by reference herein in its entirety.

In a third approach, users of devices inside and outside a home can use their application to communicate directly with event feed source 516 to access content. Specifically, within a home, users of user television equipment 502 and user computer equipment 504 may access the application to navigate among and locate desirable content. Users may also access the application outside of the home using wireless user communications devices 506 to navigate among and locate desirable content.

In a fourth approach, devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more event feed sources 516 and one or more data feed sources 518. In addition, or in the alternative, the remote computing sites may include other devices, such as user television equipment 502, user computer equipment 504, and wireless user communications device 506. For example, the other devices may provide access to a stored copy of a video or a streamed video. In such embodiments, devices may operate in a peer-to-peer manner without communicating with a central server.

The cloud provides access to services, such as content storage, content sharing, or social networking services, among other examples, as well as access to any content described above, for devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a device to store content to the cloud and to receive content from the cloud rather than storing content locally and accessing locally-stored content.

Cloud resources may be accessed by a device using, for example, a web browser, an application, a desktop application, a mobile application, and/or any combination of access applications of the same. The device may be a cloud client that relies on cloud computing for application delivery, or the device may have some functionality without access to cloud resources. For example, some applications running on the device may be cloud applications, i.e., applications delivered as a service over the Internet, while other applications may be stored and run on the device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, devices can use cloud resources for processing operations such as the processing operations performed by processing circuitry described in relation to FIG. 4.

Any one or more of device 400 and user equipment system 401 of FIG. 4 and user television equipment 502, user computer equipment 504, and wireless user communications device 506 of FIG. 5 can be used to provide a thorough and efficient content consumption experience. For example, the devices of the present disclosure can detect an occurrence of a triggering event, reorder the feed items (e.g., social media feed items) in a new order for display on the user device based on the detection of the triggered event and generate for display the feed items (e.g., social media feed items) in the feed (e.g., social media feed) in the new order. Further details of the present disclosure are discussed below in connection with the flowchart of FIG. 6.

FIG. 6 depicts an illustrative flowchart of a process 600 for reordering social media feed items, in accordance with some embodiments of the disclosure. It should be noted that the steps of process 600 can be performed by control circuitry 404 of FIG. 4. Control circuitry 404 may be part of a device having a display 412 (e.g., a device that may have any or all of the functionality of user television equipment 502, user computer equipment 504, and/or wireless communications device 506 of FIG. 5), part of a remote server separated from the user equipment by way of a communication network (e.g., communication network 514 of FIG. 5), or distributed over a combination of both.

At step 602, the system receives on a user device, a plurality of social media feed items having a defined sequential order for display in a social media feed. In one example, the social media feed items are social media posts 304 in the sequential order social media post listing 302 as illustrated and discussed above with respect to FIG. 3A. At step 604, the system detects an occurrence of a triggering event. In some embodiments, the control circuitry detects the triggering of the event. As discussed above, in one embodiment, the triggering event is an external event that occurred outside the user device. Some external events include natural disasters, sport events, entertainment events, a child entering a room where the user device is located, etc. Also, as discussed above, the triggering event can be an internal event that occurs inside the user device. In one example, the internal event includes a user scrolling through the sequential order social media post listing 302 of the social media posts 304.

At step 606, the system, in response to the detection, reorders one or more of social media feed items in a new order for display. At step 608, the system generates for display the one or more social media items in the social media feed in the new order. In one example, the new order of the social media post 304 is displayed in the social media feed listing 320 as illustrated and discussed above with respect to FIG. 3B. The system may generate social media feed items for display on a display 412 including LCD and OLED displays used for mobile devices, 3D displays, video projectors, or any other suitable equipment for displaying visual images. Display is not limited to visual content, as content may have an audio and visual component or only one of either audio or visual components. Display may further include transmission of audio content for listening through a speaker 414 such as stereo speakers, headphones, portable speakers, or any other suitable device that outputs audio.

FIG. 7 depicts an illustrative flowchart of a process 700 for reordering a plurality of feed items, in accordance with some embodiments of the disclosure. It should be noted that the steps of process 700 can be performed by control circuitry 404 of FIG. 4. Control circuitry 404 may be part of a device having a display 412 (e.g., a device that may have any or all of the functionality of user television equipment 502, user computer equipment 504, and/or wireless communications device 506 of FIG. 5), part of a remote server separated from the user equipment by way of a communication network (e.g., communication network 514 of FIG. 5), or distributed over a combination of both.

At step 702, the system stores in a memory the plurality of the feed items, having a defined sequential order for display in a feed. In one example, the feed items are the feed items 104 in the feed listing 102 stored in the defined sequential order as illustrated and discussed with respect to Table 1A above. In another example, the feed items are the feed items 204 in the feed listing 202 stored in the defined sequential order as illustrated and discussed with respect to Table 2A above. As discussed above, in one example, the feed items are messaging feed items. In another example, the feed items are media feeds items. In a further example, the feed items are social media posts. At step 704, the system monitors a speed of scrolling the plurality of feed items (scroll speed) on a user device. In one example, monitoring of the scroll speed of some of the feed items 104 from the feed listing 102 are illustrated and discussed above with respect to FIG. 1A. In another example, monitoring of the scroll speed of some of the feed items 204 from the feed listing 202 are illustrated and discussed above with respect to FIG. 2A. At step 706, the system determines that the scroll speed is equal or greater than a scroll threshold. At step 708, in response to the determination, the system reorders one or more of the feed items in a new order for display in the feed. At step 710, the system generates for display the one or more of feed items in the feed in the new order. In one example, the new order of the feed items 104 is displayed in the feed listing 120 as illustrated and discussed above with respect to FIG. 1B. In another example, the new order of the feed items 204 is displayed in the feed listing 220 as illustrated and discussed with respect to FIG. 2B. The system may generate feed items for display on a display 412 including LCD and OLED displays used for mobile devices, 3D displays, video projectors, or any other suitable equipment for displaying visual images. Display is not limited to visual content, as content may have an audio and visual component or only one of either audio or visual components. Display may further include transmission of audio content for listening through a speaker 414 such as stereo speakers, headphones, portable speakers, or any other suitable device that outputs audio.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for reordering a plurality of social media feed items, the method comprising:
   receiving, by a control circuitry on a user device, the plurality of the social media feed items, wherein the plurality of social media feed items have a defined sequential order for display in a social media feed;
   detecting, by the control circuitry, a presence of an additional user in proximity to the user device;
   in response to the detection of the presence of the additional user in proximity to the user device, automatically reordering, by the control circuitry, the plurality of the social media feed items in a new order so as to avoid display of one or more of the social media feed items of the plurality of feed items not relevant to the additional user; and generating for display, using the control circuitry, the plurality of social media feed items in the social media feed in the new order.

2. The method of claim 1, wherein the reordering comprises:

placing the one or more of the social media feed items among the plurality of social media feed items at bottom of the new order.

3. The method of claim 1 wherein a priority is assigned to each of the plurality of the social media feed items.

4. The method of claim 3 wherein the reordering the plurality of social media feed items comprises rearranging the defined sequential order of the social media feed items for display based on the priority assigned to each of the plurality of social media feed items.

5. The method of claim 1 further comprising displaying at least some of the plurality of social media feed items in the defined sequential order prior to displaying the one or more social media feed items in the social media feed in the new order.

6. A method for reordering a plurality of social media feed items, the method comprising:

causing, using a server, a social media application to be implemented on a client device, the social media application configured to:

receive social media feed items;

cause the client device to display the social media feed items of the plurality of social media feed items; and detect a presence of an additional user in proximity to the client device; and in response to the detecting, automatically reorder the plurality of social media feed items at the client device so as to avoid display of one or more of the social media feed items of the plurality of feed items not relevant to the additional user.

7. The method of claim 6, further comprising:

transmitting, using one of a plurality of servers, to the client device implementing the social media application, the plurality of social media feed items, wherein the plurality of social media feed items have a defined sequential order for display in a social media feed of the social media application at the client device.

8. A system comprising:
memory; and
control circuitry configured to:

receive on a user device, a plurality of the social media feed items, wherein the plurality of social media feed items have a defined sequential order for display in a social media feed;

detect a presence of an additional user in proximity to the user device;

in response to the detection, automatically reorder, the plurality of the social media feed items in a new order; and generate for display the plurality of social media items in the social media feed in the new order so as to avoid display of one or more of the social media feed items of the plurality of feed items not relevant to the additional user.

9. The system of claim 8 wherein to reorder, the control circuitry is configured to place the one or more of the social media feed items among the plurality of social media feed items at a bottom of the new order.

10. The system of claim 8 wherein a priority is assigned to each of the plurality of the social media feed items.

11. The system of claim 10 wherein to reorder the plurality of the social media feed items in a new order for display, the control circuitry is configured to rearrange the defined sequential order of the plurality of the social media feed items for display based on the priority assigned to each of the plurality of social media feed items.

12. The system of claim 8 wherein the control circuitry is configured to display at least some of the plurality of social media feed items in the defined sequential order prior to displaying the one or more social media feed items in the social media feed in the new order.

13. The method of claim 1, wherein:
the feed is scrollable, and
the automatically reordering comprises moving a social media feed item that was previously scrolled through to the top of the new order for display.

14. The method of claim 6, wherein:
the feed is scrollable, and
the automatically reordering comprises moving a social media feed item that was previously scrolled through to the top of the new order for display.

15. The system of claim 8, wherein:
the feed is scrollable, and
the automatically reordering comprises moving a social media feed item that was previously scrolled through to the top of the new order for display.

16. The method of claim 1, wherein the detection of the presence of the additional user in proximity to the user device comprises detecting the additional user being sufficiently close to the user device to view a display of the user device.

* * * * *